US010759685B2

(12) United States Patent
Blumenschein et al.

(10) Patent No.: US 10,759,685 B2
(45) Date of Patent: Sep. 1, 2020

(54) WATER SOFTENING TREATMENT USING IN-SITU BALLASTED FLOCCULATION SYSTEM

(71) Applicant: VEOLIA WATER SOLUTIONS & TECHNOLOGIES SUPPORT, Saint Maurice (FR)

(72) Inventors: Charles D. Blumenschein, Pittsburgh, PA (US); Stephanie Mauchaufee, Sartrouville (FR); Eric Barbier, Montesson (FR)

(73) Assignee: VEOLIA WATER SOLUTIONS & TECHNOLOGIES SUPPORT, Saint Maurice (FR)

( * ) Notice: Subject to any disclaimer, the term of this patent is extended or adjusted under 35 U.S.C. 154(b) by 204 days.

(21) Appl. No.: 15/736,199

(22) PCT Filed: Jun. 17, 2016

(86) PCT No.: PCT/EP2016/063998
§ 371 (c)(1),
(2) Date: Dec. 13, 2017

(87) PCT Pub. No.: WO2016/202976
PCT Pub. Date: Dec. 22, 2016

(65) Prior Publication Data
US 2018/0194656 A1    Jul. 12, 2018

(30) Foreign Application Priority Data
Jun. 19, 2015    (EP) .................... 15305951

(51) Int. Cl.
*C02F 1/52*    (2006.01)
*C02F 1/56*    (2006.01)
(Continued)

(52) U.S. Cl.
CPC ............. *C02F 5/06* (2013.01); *C02F 1/5245* (2013.01); *C02F 1/56* (2013.01); *C02F 5/04* (2013.01);
(Continued)

(58) Field of Classification Search
None
See application file for complete search history.

(56) References Cited

U.S. PATENT DOCUMENTS 2,348,122 A    5/1944   Green
5,635,073 A    6/1997   Aktor et al.
(Continued)

FOREIGN PATENT DOCUMENTS

EP    2221101    8/2010
WO    9803433    1/1998
(Continued)

OTHER PUBLICATIONS

International Search Report and Written Opinion issued in International Application No. PCT/EP2016/063998 dated Aug. 3, 2016 (11 pages).
(Continued)

*Primary Examiner* — Bradley R Spies
(74) *Attorney, Agent, or Firm* — Hamre, Schumann, Mueller & Larson, P.C.

(57) ABSTRACT

The present invention concerns a process for treating waters containing at least two different dissolved inorganic salts which do not precipitate and/or crystallize in the same conditions by precipitation and ballasted flocculation, in which the ballast is produced in situ.

20 Claims, 3 Drawing Sheets

(51) Int. Cl.
*C02F 5/06* (2006.01)
*C08L 33/26* (2006.01)
*C02F 5/04* (2006.01)
*C02F 1/66* (2006.01)
*C02F 103/00* (2006.01)
*C02F 103/10* (2006.01)
*C02F 103/34* (2006.01)

(52) U.S. Cl.
CPC .......... *C08L 33/26* (2013.01); *C02F 1/5209* (2013.01); *C02F 1/66* (2013.01); *C02F 2103/007* (2013.01); *C02F 2103/10* (2013.01); *C02F 2103/34* (2013.01); *C02F 2209/105* (2013.01); *C02F 2305/12* (2013.01)

(56) References Cited

U.S. PATENT DOCUMENTS

| | | | |
|---|---|---|---|
| 6,040,631 | A | 3/2000 | Dibble et al. |
| 7,648,637 | B1 | 1/2010 | Sauvignet et al. |
| 2007/0163955 | A1* | 7/2007 | Sun .................... B01D 21/2488 210/625 |
| 2010/0096335 | A1* | 4/2010 | Sauvignet .......... B01D 21/0045 210/709 |
| 2013/0048562 | A1 | 2/2013 | Keister |
| 2013/0248455 | A1* | 9/2013 | Blumenschein ...... C02F 1/5236 210/713 |
| 2013/0313201 | A1* | 11/2013 | Blumenschein .......... C02F 5/02 210/713 |
| 2014/0262734 | A1* | 9/2014 | Gamache ................. C02F 9/00 203/10 |

FOREIGN PATENT DOCUMENTS

| | | |
|---|---|---|
| WO | 0236500 | 5/2002 |
| WO | 03053862 | 7/2003 |
| WO | 2013150222 | 10/2013 |
| WO | 2013177402 | 11/2013 |
| WO | 2015042574 | 3/2015 |
| WO | 2015042584 | 3/2015 |

OTHER PUBLICATIONS

Piirtola et al.: "Activated Sludge Ballasting in Batch Tests"; Water Research, vol. 33, 1999, pp. 1799-1804.

Kedem et al: "Compact accelerated precipitation softening (CAPS) as a pretreatment for membrane desalination I. Softening by NaOH"; Desalination, vol. 113, 1997, pp. 65-71.

* cited by examiner

WATER SOFTENING TREATMENT USING IN-SITU BALLASTED FLOCCULATION SYSTEM

The invention concerns water treatment, in particular water softening treatment of industrial or waste water, using ballasted flocculation system.

The removal of undesirable compounds from water can be carried out by physico-chemical treatments of insoluble salts (precipitation, crystallization . . . ) and/or of suspended particles (coagulation, flocculation).

Traditionally, water softening processes have four steps, which can be carried out simultaneously or successively in the following order:

A coagulation step of the effluent to be treated by addition of a coagulant, usually a trivalent metal salt;

A precipitation step by addition of a precipitation agent which depends on the precipitable inorganic salt (limestone, gypsum, magnesium hydroxide, calcium phosphate, silica, metal hydroxides . . . ) contained in the effluent to be treated;

A flocculation step by addition of a flocculant (by example: polymer . . . ) and in the case of ballasted flocculation by the supplemental addition of a ballast which allows the quicker decantation of flocculated particles;

A decantation/clarification step: separation of the reaction products (crystals, flocs . . . ) out of treated water.

Traditionally ballasted flocculation is carried out by addition of a ballast (insoluble inert particles having a density higher than the density of the effluent to be treated (for example: micro sand)) together with the flocculant during the flocculation step. The ballast can be added at any time during the process, upstream of the decantation step. A pre-contact between the flocculant and the ballast can be carried out upstream of the injection of the mixture obtained in the flocculation vessel. The particles present in the vessel (produced by precipitation or inherent to the effluent's nature) thus agglomerate around the ballast, forming flocs of high density which will increase their settling velocity.

The ballast can also be recycled. A separation device which allows the separation of the reaction products from the ballast is therefore installed between the "solid" output of the clarification step and the flocculation vessel. After separation, the ballast is directly reused in the flocculation step whereas the reaction products are removed from the system.

In existing softening processes, there is no hydraulic dissociation of the coagulation, precipitation, ballasted flocculation and clarification steps due to the presence of a recirculation loop in the process. It is therefore not possible to work in different operational conditions in the system's reactors. The decrease of precipitable salts taking place in only one reaction zone, the working pH range limit the possibilities to precipitate simultaneously several salts of different nature.

Moreover, the ballast recycle requires the implementation of a recirculation loop for allowing the ballast transport from the clarification step to the flocculation vessel through a separation device. This increases the energetic consumption of the treatment process.

Finally, the ballast is defined as being an inert granular material having a density higher than the one of water. Generally, the ballast used is micro-sand. According to table 1 below, the micro-sand's density is close to the density of precipitable salts during the softening step. The separation of both products based on density is complex and lead to losses in ballast.

TABLE 1

Example of density of precipitable salts and micro-sand

| Solid | Density |
|---|---|
| Micro sand | 2.65 |
| Limestone ($CaCO_3$) | 2.68-2.76 |
| Gypsum ($CaSO_4$; $2H_2O$) | 2.3-2.4 |

In particular, patent application WO 02/36500 describes a treatment process of waste water using the four steps indicated above: coagulation-precipitation (softening)-ballasted flocculation-clarification, allowing the elimination of both dissolved and suspended solids in the effluent to be treated. The ballasted flocculation is carried out by addition of a granular material. The granular material is returned to the flocculation step whereas part of the sludge obtained at the output of the clarification step is returned to the precipitation step to promote particles growth.

Therefore the process described contains a recirculation loop for the ballast which presents the aforementioned problems: energetic consumption increase, difficulty of separation of the ballast from the precipitable salts and risk of loss of part of the ballast, impossibility of treating in only one process two pollutions of different natures.

Patent application WO 2013/177402 describes a ballasted flocculation system that chemically softens water and causes hardness particles to precipitate from the water and crystallize. In the course of crystallizing, the hardness particles grow and form ballasted floc that are separated from the water in the form of sludge by a clarification unit, producing a clarified effluent. The separated sludge including the hardness crystals is directed to a separator where the sludge is separated into two streams with each stream having hardness crystals contained therein. In one process design, one stream includes relatively small hardness crystals and the other stream includes relatively large hardness crystals. The stream having the relatively small hardness crystals is directed to a first reactor and mixed with the incoming water and a softening reagent to promote growth of the particles. The stream having the relatively large crystals is directed to a second downstream reactor and mixed with water and a flocculant which facilitates the growth of the hardness crystals.

However there is no hydraulic dissociation between the softening step, the flocculation step and the separation step and therefore it is impossible to use this process to treat two pollutions of different natures.

Patent application WO 2015/042574 describes a process of decarbonatation and softening using lime and soda ash as reactive in order to precipitate the pollution contained therein (calcium, magnesium, barium and strontium carbonate, hydroxide and calcium and magnesium carbonate). However, the precipitated solids obtained in the reactors do not have a controlled size or density and their quantity is also not controlled. They could therefore not be used as ballast in the flocculation tank. Therefore a ballasted flocculation is not at all described in this document. Indeed in case of a ballasted flocculation it is necessary that the characteristics of the ballast are controlled such as its size, density and quantity, in order to insure a high decantation rate: the decantation rate (in m/s) follows the following formula:

$$\frac{2 \cdot r^2 \cdot g \cdot \Delta(\rho)}{9 \cdot \eta}$$

in which
r: radius of the particle (in m)
g: m/s$^2$
ρ: density difference between the particles and water-bulk density in kg/m$^3$
η: Viscosity in kg/m·s.

Therefore there is a need to find a way to eliminate, in one process, two pollutions having different nature and whose treatment conditions are not compatibles by using a water treatment with ballasted flocculation while avoiding the use of a recirculation loop of the ballast.

The inventors have surprisingly found that it is possible to continuously produce ballast in situ, which avoid the need of a recirculation loop and associated problems, while at the same time allowing the elimination in one process of two different inorganic salts dissolved in the water to be treated, said inorganic salts not having the same conditions of precipitation and/or crystallization. In order to do so, it is necessary to dissociate the step of formation of ballast and the step of flocculation and in the step of ballast formation to obtain particles with a controlled size and/or controlled density.

Therefore the present invention concerns a process for treating waters containing dissolved inorganic salts by precipitation and ballasted flocculation comprising (advantageously being constituted by) the following steps:

a—supplying water containing dissolved inorganic salts, said inorganic salts comprising at least two different inorganic salts which do not precipitate and/or crystallize in the same conditions;

b—in a first reactor precipitating and/or crystallizing a first inorganic salt in order to obtain particles having a controlled size whose D50 in volume measured by a Coulter granulometer is within 10 to 2500 μm, advantageously within 50 to 1000 μm, and separating on the one hand water depleted in said first inorganic salt and on the other hand precipitated/crystallized particles of said first inorganic salt having a controlled size;

c—in a second reactor precipitating a second inorganic salt from the water depleted in said first inorganic salt and collecting water depleted in said first and second inorganic salts;

d—flocculating by addition, in the water depleted in said first and second inorganic salts, of a flocculant, advantageously of a polyacrylamide polymer, and of a ballast which is stable in the flocculation conditions, said ballast being constituted by some or all the precipitated/crystallized particles of said first inorganic salt having a controlled size obtained in step (b);

e—separating the treated water from the solid contained therein and collecting said treated water.

In the sense of the present invention, the term "flocculating" has the common meaning in the art of waste water treatment; in particular it is intended to mean agglomerating or causing floc growth by the use of flocculant to enhance the particles settling velocity and the solid/liquid separation.

In the sense of the present invention, the term "floc" has the common meaning in the art of waste water treatment; in particular it is intended to mean any agglomerate of fine particles or colloids in suspension in water.

In the sense of the present invention, the term "flocculant" has the common meaning in the art of waste water treatment; its other synonym are flocculating agent and flocking agent. In particular it is intended to mean any mineral or organic polymer, with natural or synthetic origin, which promotes the formation of flocs when added in water by causing colloids and other suspended particles to aggregate. In particular many flocculants are multivalent cations, such as aluminum, iron, calcium or magnesium, which interact with the negatively charged suspended particles and reduce the barriers to aggregation. It can be a polyacrylamide polymer, in particular an anionic polyacrylamide polymer.

In the sense of the present invention, the term "ballast" has the common meaning in the art of waste water treatment; in particular it is intended to mean any insoluble inert granular material having a density higher than the one of water, injected into or upstream of the flocculation zone in order to increase the density of flocs formed during the flocculation phase and their settling rate.

In the process according to the present invention, the ballast is continuously produced during step (b). Therefore there is no need for recycling the ballast and for a recirculation loop for the ballast. As a consequence the process according to the present invention does not contain any ballast recirculation loop or any step of recycling the ballast after its use in step (d).

Moreover, there is no need to have a separation device for ballast/small particles (like hydrocyclone or hydroclassifer).

Step (b) of formation of the ballast and step (d) of flocculation in the process of the present invention being disassociated due to the absence of a recirculation loop, it is then possible to precipitate two or more salts in different precipitation conditions in the same process. Therefore steps (b) and (d) are not carried out in the same reactor and there is a physico-chemical conditions dissociation between these two steps.

The process according to the present invention contains step (a) which consists in the supply of a water containing dissolved inorganic salts, said inorganic salts comprising at least two different inorganic salts which do not precipitate and/or crystallize in the same conditions. This water is also named feed water.

Said water is therefore the water to be treated in the process according to the present invention. Therefore the water of step (a) can be an industrial (such as waste water or water named "process" water), municipal (such as waste water or drinking water), surface water such as river water or underground water. In particular it is a waste water or an industrial water. Industrial water can come from mining, steel, oil & gas industries such as produced or drilling water or chemical industry. Water coming from mining industry, such as Acid Mining Drainage (AMD) can contain for example between 1 and 300 g/l of dissolved inorganic salts, in particular between 4 and 12 g/l.

In said water are dissolved at least two different inorganic salts which do not precipitate and/or crystallize in the same conditions, in particular only two different inorganic salts which do not precipitate and/or crystallize in the same conditions. The water can therefore contain:

several different inorganic salts which precipitate and/or crystallize in the same first conditions and several different inorganic salts which precipitate and/or crystallize in the same second conditions different from the first conditions or several different inorganic salts which precipitate and/or crystallize in the same first conditions and only one different inorganic salt which precipitate and/or crystallize in the second conditions different from the first conditions, or only one inorganic salt which precipitate and/or crystallize in the same first conditions and several inorganic salt which precipitate and/or crystallize in the same second conditions different from the first conditions or only one inorganic salt which precipitate and/or crystallize in the first conditions and only one inorganic salt which precipitate and/or crystallize in the second conditions different from the first conditions.

In the sense of the present invention, "two different inorganic salts which do not precipitate and/or crystallize in the same conditions" is intended to mean that both salts could not precipitate and/or crystallize in the same operating condition and therefore that it is necessary to apply a first operating condition in order to precipitate and/or crystallize the first inorganic salt dissolved in the water to be treated and then to apply a second operating condition, different from the first one, in order to precipitate and/or crystallize the second inorganic salt dissolved in the water to be treated.

For example, the two different inorganic salts precipitate in different pH conditions and/or in different temperature conditions and/or by addition of different precipitation reagents and/or by addition of another solvent and/or in different redox conditions.

In this case different operating conditions could be different pH conditions, solvent conditions, temperature conditions, redox conditions, precipitation reagent conditions and a mixture of one or more of these conditions.

Moreover, it is necessary for the crystallized and/or precipitated particles of the first inorganic salt to remain stable in the flocculating conditions of step (d).

In the sense of the present invention, "stable in the flocculating conditions" is intended to mean that the particles will not dissolve in water in the flocculating conditions and therefore could play their ballast role for the ballasted flocculation.

Advantageously said first and second inorganic salts according to the present invention are alkali salts.

In particular said first inorganic salt is selected among calcium carbonate, calcium sulfate, barium sulfate and mixture thereof, advantageously it is calcium carbonate.

Advantageously the second inorganic salt is selected among silica salts, fluorides salts, phosphates salts, strontium salts, metallic salts and mixture thereof, more advantageously it is silica salts.

In a particular advantageous embodiment of the present invention,
said first inorganic salt is calcium carbonate and said second inorganic salt is selected among silica salts, metallic salts and mixture thereof or
said first inorganic salt is calcium sulfate and said second inorganic salt is selected among fluorides salts, phosphates salts and mixture thereof or
said first inorganic salt is barium sulfate and said second inorganic salt is strontium salts.

More advantageously, said first inorganic salt is calcium carbonate and said second inorganic salt is silica salts.

The water of step (a) can also contain, further to the at least two different inorganic salts which do not precipitate and/or crystallize in the same conditions, suspended solid matters and/or organic matters which are going to be eliminated during one of the step of the process by driving of the solid matters and/or the organic matters with the flocs and/or the precipitated particles.

The process according to the present invention contains step (b) which consists in precipitating and/or crystallizing in a first reactor a first inorganic salt in order to obtain particles having a controlled size (in particular whose size remains similar over time) whose D50 in volume measured by a Beckman Coulter granulometer LS13 320 is within 10 to 2500 µm, advantageously within 50 to 1000 µm, in particular 50 to 250 µm, and separating on the one hand water depleted in said first inorganic salt and on the other hand precipitated/crystallized particles of said first inorganic salt having a controlled size.

In another particular embodiment, the particles of the first inorganic salt have a controlled density (in particular a density which remains similar over time), advantageously a density >2, in particular >2.3, more advantageously >2.6. Therefore the first inorganic salt precipitates and/or crystallizes in the form of particles which can grow until obtaining particles having the desired controlled size and/or controlled density.

In the context of the present invention, the particles are defined as fine solids carried by the water. They can be collected and quantified by filtration (size) or other physical means (mass, density, form, . . . )

It is during step (b) that the ballast is produced. Indeed the precipitated/crystallized particles of said first inorganic salt having a controlled size and/or controlled density will be used as a ballast in step (d) of the process according to the present invention.

Advantageously, said first inorganic salt is selected among calcium carbonate, calcium sulfate, barium sulfate and mixture thereof, more advantageously it is calcium carbonate.

The reactor used in the step (b) of the present invention allows producing in situ particles of a controlled size and/or controlled density due to its capacity to carry out simultaneously the precipitation and/or crystallization and classification of the size of the particles.

The reactor of step (b) can be a high solid reactor with integrated solid-liquid separation or a fluidized bed, advantageously a high solid reactor with integrated solid-liquid separation.

In the sense of the present invention a high solid reactor with integrated solid-liquid separation is intended to mean a reactor having a high Total Suspended Solids content with an integrated solid-liquid separation, in particular a Total Suspended Solids content of between 5 and 800 g/l, advantageously of between 20 and 800 g/l, more advantageously of between 25 and 250 g/l, with an integrated solid-liquid separation. The Total Suspended Solids (TSS) can be measured in situ by a sensor measuring the total suspended solids or by regular sampling and measure of the TSS in these samples. In particular the high solid reactor with integrated solid-liquid separation is for example described in WO2013/150222.

The reactor therefore comprises
a mixing tank comprising an inlet path for the effluent to be treated (in the present case for the water of step (a)),
an optional inlet path for reagents (in the present case for example for precipitation reagents and/or agents for modifying the pH and/or the redox conditions), and/or,
a stirring source for generating a turbulent stir in a given volume of said tank,
an extraction path for discharging sludge (in the present case for discharging the precipitated and/or crystallized particles of controlled size and/or controlled density which will be used as a ballast in step (d) of the process according to the present invention),
and an extraction path for treated effluent (in the present case for obtaining the water depleted in said first inorganic salt),
and further comprising above and adjacent to the given volume, but below the treated-effluent outlet path, a settling structure comprising a plurality of ducts extending from the bottom to the top and arranged in the form of a baffle so that no particle can flow through said layer along a rectilinear path.

The high solid reactor with integrated solid-liquid separation is for example available on the market under the trade name Saphira™.

In a particular embodiment the Total Suspended Solids content in the reactor of step (b) is of between 5 and 800 g/l, advantageously of between 20 and 800 g/l, more advantageously of between 25 and 250 g/l. The Total Suspended Solids (TSS) can be measured in situ by a sensor measuring the total suspended solids or by regular sampling and measure of the TSS in these samples.

In another particular embodiment, the hydraulic residence time (HRT) in the reactor of step (b) is comprised between 3 min and 2 hours and advantageously of between 5 and 30 minutes. The hydraulic residence time is calculated by the following formula: HRT=V/Q with V=volume of the reactor of step (b) and Q=reactor's flowrate of the influent of step (a).

In order to precipitate and/or crystallize the particles of the first inorganic salt in step (b), the conditions in the reactor of step (b) are modified when compared to the characteristics of the feed water, for example by the addition of a precipitation reagent and/or another solvent and/or by the modification of the pH, redox and/or temperature conditions. However these new conditions are incompatible with the precipitation and/or crystallization of the second inorganic salts.

In particular, if said first inorganic salt is a carbonate salt, calcium salt and hydroxide salt (as lime) can be added in order to obtain a pH of between 9.5 and 10.

If said first inorganic salt is a sulfate salt, $CaCl_2$ or lime, or barium salt could be added as a precipitation reagent.

In the sense of the present invention, "water depleted in said first inorganic salt" is intended to mean that its concentration in solubilized first inorganic salt is below the initial one, in particular below the concentration in solubilized first inorganic salt of the feed water.

Water depleted in said first inorganic salt advantageously corresponds to the liquid supernatant of the reactor of step (b).

The process according to the present invention contains step (c) which consists in precipitating in a second reactor a second inorganic salt from the water depleted in said first inorganic salt and collecting water depleted in said first and second inorganic salts.

Indeed, the water depleted in said first inorganic salt obtained in step (b) is transferred to a second reactor, in which different conditions are applied in order to precipitate the second inorganic salt.

These conditions could be for example a modification in the pH, temperature and/or redox conditions, and/or the addition of a precipitating agent or of another solvent.

Advantageously the second inorganic salt is selected among silica salt, fluorides salts, phosphates salts, strontium salts, metallic salts and mixture thereof, more advantageously it is silica salts.

In particular, if said second inorganic salt is a silica salt, magnesium salt can be added as a precipitating agent and caustic reagent (as NaOH) can be added in order to obtain a pH of between 10.5 and 11 and strictly different from the pH of step (b).

In particular, if said second inorganic salt is phosphate salts, calcium salt (as lime) & hydroxide salts/reagent can be added in order to obtain a pH between 9.0 and 10 and strictly different from the pH of step (b), or potentially magnesium salt and/or ammonia salts and hydroxide salts/reagent in order to obtain a pH between 9.5 and 11 and strictly different from the pH of step (b).

In particular, if said second inorganic salt is fluoride salts, calcium salts (as lime, $CaCl_2$) and hydroxide salts/reagent can be added in order to obtain a pH above 6.5-7 and strictly different from the pH of step (b).

In particular, if said second inorganic salt are metallic salts, hydroxide salts/reagent can be added in order to obtain a pH evolution promoting said salt insolubility and strictly different from the pH of step (b).

In the sense of the present invention, "water depleted in said first and second inorganic salt" is intended to mean that their concentrations in solubilized first and second inorganic salt are below the initial one, in particular below than the concentrations in solubilized first and second inorganic salt of the feed water and more particularly that the concentration of the solubilized second inorganic salt is below its concentration in step (b). The reactor of step (c) can be stirred. Advantageously, it could be a Turbomix® reactor, in particular a perfectly stirred Turbomix® reactor.

It is during this step that the second inorganic salt is removed by precipitation and/or crystallization from the water to be treated.

In a particular embodiment, part of the water of step (a) is directly added in step (c), without being pre-treated in step (b). In this case, the water treated in step (c) can still contain the first inorganic salt.

Indeed, it can be advantageous that only the necessary quantity of ballast is produced in step (b) and therefore that only the necessary quantity of water for producing the necessary quantity of ballast is treated in step (b).

The process according to the present invention contains step (d) which consists in flocculating by addition, in the water depleted in said first and second inorganic salts, of a flocculant, advantageously of a polyacrylamide polymer, in particular an anionic polyacrylamide polymer, and of a ballast which is stable in the flocculation conditions, said ballast being constituted by some or all the precipitated/crystallized particles of said first inorganic salt having a controlled size and/or controlled density obtained in step (b).

In the case where only part of the precipitated/crystallized particles of said first inorganic salt having a controlled size and/or controlled density obtained in step (b) is used as the ballast in step (d), the remainder of the precipitated/crystallized particles of said first inorganic salt having a controlled size and/or controlled density which is not used can be discarded. The reactor of step (d) can be stirred. Advantageously, it could be a Turbomix® reactor, in particular a perfectly stirred Turbomix® reactor.

In a particular embodiment, steps (c) and (d) are carried out simultaneously in the same reactor.

In another particular embodiment steps (c) and (d) are carried out successively in different reactors.

In still another particular embodiment the flocculant is brought into contact (for example partially or totally) with the ballast before their use in step (d). Except in the case where the flocculant is added beforehand, the precipitated/crystallized particles of said first inorganic salt having a controlled size and/or controlled density comes directly from step (b) without any pre-treatment or transformation.

Step (d) allows the formation of ballasted flocs and therefore the removal of suspended matters, which are going to be separated and discarded from the treated water in step (e).

The process according to the present invention contains step (e) which consists in separating the treated water from the solid contained therein and collecting said treated water, which advantageously is a soft clarified water. This step is therefore a solid-liquid separation step and allows obtaining the treated water. It can also be named a clarification step. Generally the flocs (the solids contained in the water) are discarded. Advantageously therefore the ballasts are not separated from the flocs and are not recycled. More advantageously there is no recirculation loop for the ballast.

In an advantageous embodiment, step (e) is carried out in a lamellar clarifier.

At the start of the process, an initialization stage can exist.

Indeed, initially some particles are produced by the system from the first hours, days of operation which did not respect size and density (i.e. mass) for the ballasted flocculation (Step b).

During this period, it can be suggested to operate the ballasted flocculation with heavy particles addition as Microsand, or other heavy insoluble mineral salts solid (as CaCO3 . . . ) (Step d).

With time, the specific performances of the first precipitation reactor helps particles to growth, densify itself within the reactor by accurate mixing and hydrodynamic conditions for particle Growth and densification (step b)

Once an accurate solid size and density of the population of particle is reached in average (mass, heavy particle ratio), heavy produced particles replace the use of heavy seeds use for the process start and operation. Overall process is then able to operate with time, including continuous production of ballasts.

In a particular embodiment, the method according to the present invention comprises a coagulation intermediary step (b1) between steps (b) and (c) or between steps (a) and (b), advantageously between steps (b) and (c), by addition of a coagulant, advantageously a trivalent metal salt, such as $FeCl_3$. This step allows the recovery of particles that could not be eliminated in steps (b) or (c), in general known as suspended solids non settleable in such hydraulic conditions.

In the sense of the present invention, the term "coagulation" has the common meaning in the art of waste water treatment; in particular it is intended to mean reduction or cancellation, under the action of a coagulant or coagulation adjuvant, of electrical charges carried by colloidal particles suspended in water, to promote their agglomeration.

The reactor of step (b1) can be stirred. Advantageously, it could be a Turbomix® reactor, in particular a perfectly stirred Turbomix® reactor.

Steps (b1) and (c) can be carried out simultaneously in the same reactor.

The coagulant can be added directly in the reactor or beforehand, in the pipe before the reactor of step (b1).

The invention will be better understood in view of the description of the figures and the examples which are given in a non-limitative way.

Example 1: process according to the present invention containing steps (a), (b), (b1), (c) and (d)

Figure 1:
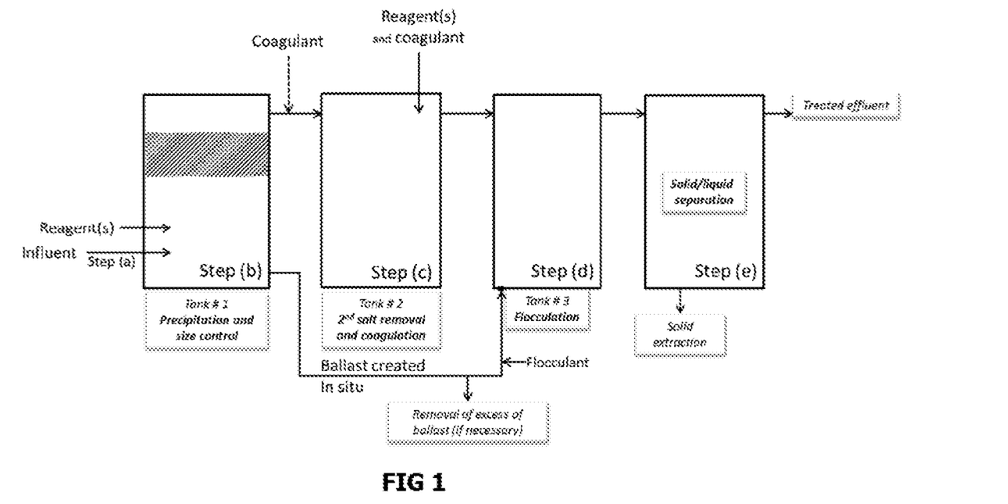
FIG. 1 represents an example embodiment of the method according to the present invention in which steps (a), (b), (b1), (c), (d) and (e) are carried out.
Figure 2:
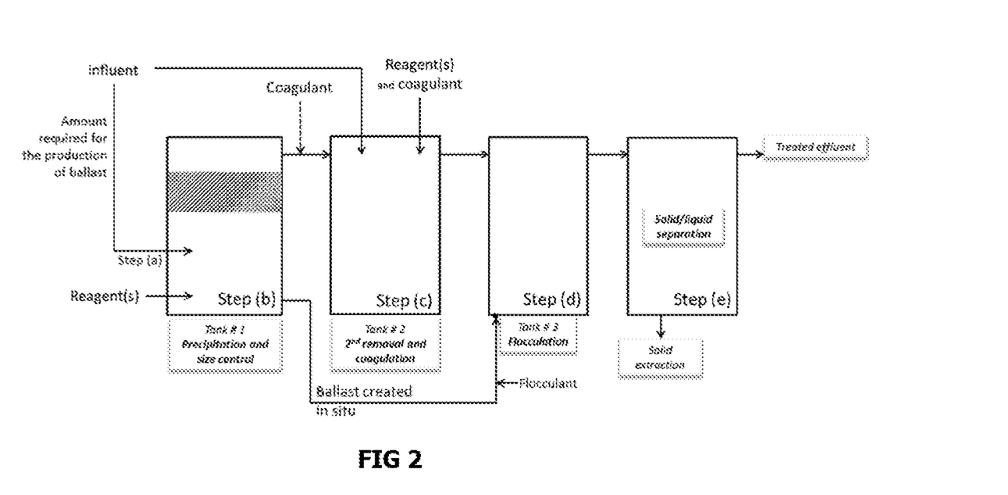
FIG. 2 represents another example embodiment of the method according to the present invention in which steps (a), (b), (b1), (c), (d) and (e) are carried out and only part of the water of step (a) is directly added in step (c).
Figure 3:
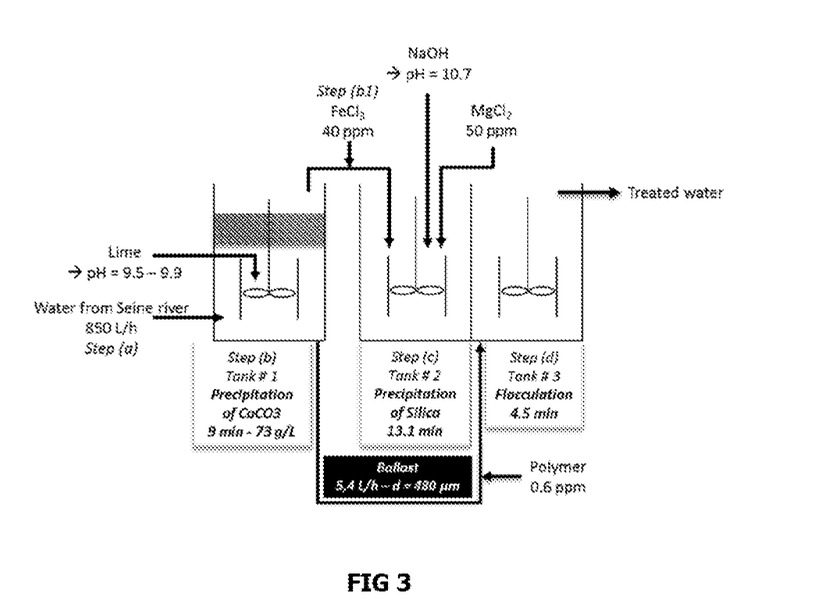
FIG. 3 represents a schematic view of the system used in example 1 for carrying out the process according to the present invention.

In this example, carbonates and silica contained in water are removed in a single process. The schematic view of the system used in this example is represented in FIG. 3.

Calcium carbonate is the first inorganic salt according to the present invention and silica salts the second inorganic salt according to the present invention. Water of step (a) is the water from the Seine River. 850 L/h of this water is added in the reactor of step (b).

Step (b) is carried out in reactor (tank) #1. The reactor used is the reactor described in WO2013/150222 having a size: l×L×h=500×500×1300 mm including a precipitation volume of 130 L with a Total Suspended Solids content of 73 g/L and a hydraulic residence time of 9 minutes.

Lime is added as a reagent in order to obtain a pH of between 9.5 and 9.9 and to obtain the precipitation and crystallization of $CaCO_3$ in the reactor of step (b).

The coagulant $FeCl_3$, in an amount of 40 mg/L is added in the pipe between the reactor of step (b) and the reactor of step (c).

The coagulation step (b1) is carried out at the same time as step (c) in the same reactor: reactor (tank) #2, which is a Turbomix® reactor fully agitated. $MgCl_2$ at a concentration of 50 mg/L and NaOH in order to obtain a pH of 10.7 are added in the reactor of step (c) in order to obtain the precipitation of silica. The hydraulic residence time in the reactor of step (c) is 13.1 min.

The flocculant which is an anionic polyacrylamide polymer, at a concentration of 0.6 mg/L, is added to the ballast before their addition in the flocculation step (d).

The flocculation step (d) is carried out in reactor (tank) #3, which is a Turbomix® reactor fully agitated.

The ballast has a D50 in volume measured by a Beckman Coulter granulometer LS13 320 used with software LS3 series of 480 µm and is added in the flocculation step (d) at flowrate of 5.4 L/h.

The treated water is recovered from the reactor #3 outflow (flocculation step (d) outlet).

The chemical characteristics of the effluent before and after treatment are as follow:

TABLE 2

Results obtained on chemistry in configuration of example 1

| | Raw water | Reactor #1 | Reactor #1 Outflow | Reactor #2 | Reactor #3 | Reactor #3 Outflow |
|---|---|---|---|---|---|---|
| pH | 7.9 | 9.9 | 9.6 | 10.7 | 10.7 | 10.6 |
| Ca (mg/L) | 90 | | 25 | | | 20 |
| Mg (mg/L) | 4 | | 5 | | | 10 |
| TAC (eq. mg $CaCO_3$/L) | 165 | | 60 | | | 65 |
| $SiO_2$ (mg/L) | 33 | | 28 | | | 10 |

The process according to the invention therefore allow in the case of example 1 the elimination of 70% by weight of the silica contained in the effluent to be treated while 78% by weight of calcium and 61% of alkalinity is also eliminated despite their differences in elimination conditions (pH, reagents . . . ).

Figure 4:
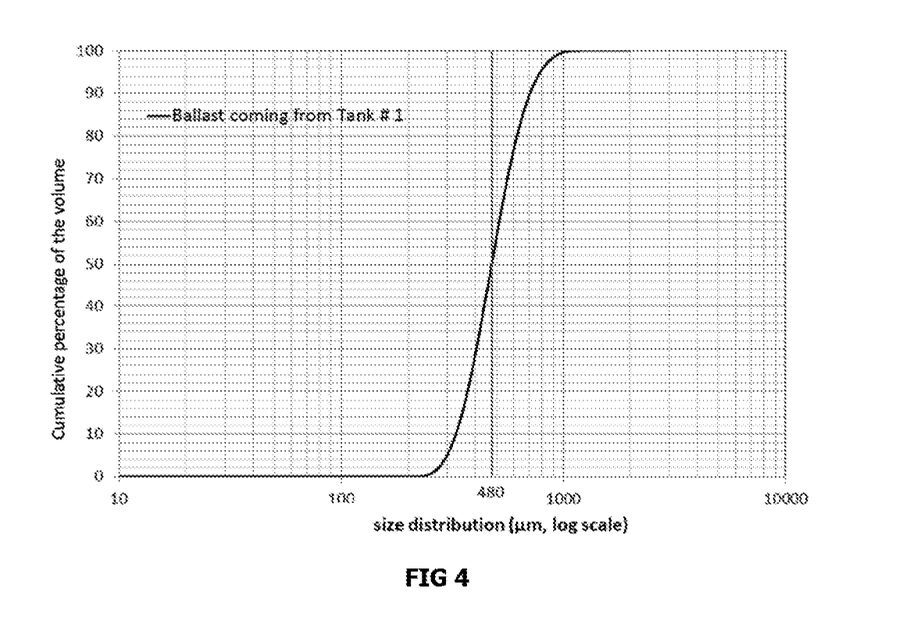
FIG. 4 represents the cumulative particle size distribution (µm, log scale) according to the % vol of the ballast for example 1.

Particle size analysis of the ballast created in Tank#1 is carried out with a Beckman Coulter granulometer LS13 320 used with software LS3 series and presented on FIG. 4. The obtained cumulative curve shows a D50 for the particles equals to 480 µm.

Figure 5:
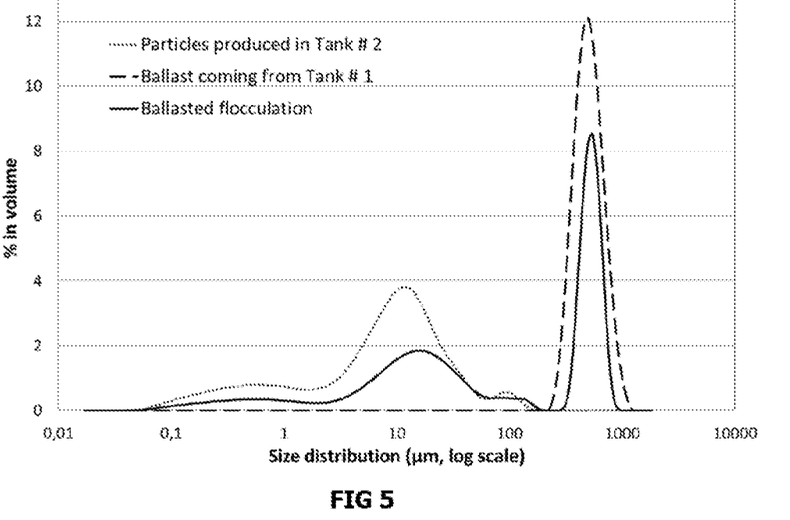
FIG. 5 represents the particle size distribution (µm, log scale) according to the % vol of the particles in the flocculation tank compared to ballast and particles precipitated in step (c) for example 1.

As can be observed on the graph of FIG. 5, the particle size distribution obtained in a sample of the sludge from the flocculation vessel (Reactor #3) is a mixture of the particle size distribution of the ballast and of the small particles produced during the elimination step of the second pollution (the second inorganic salt).

Jar-tests on ballasted flocculation are carried out on softened Seine river water to demonstrate the advantage of a ballasted flocculation with in-situ ballast production compared to simple flocculation. Flocculation is carried out with single addition of polymer and the ballasted flocculation by addition of polymer and ballast produced in step (b) of example 1.

TABLE 3

Results of lab-scale jar-tests

|  | Seine River water | Softened Seine water | After flocculation | After ballasted flocculation with in-situ produced ballast |
|---|---|---|---|---|
| pH | 8.3 | 9.3 | 10.7 | 10.7 |
| SiO2 (mg/L) | 33 | 33 | 11 | 9 |
| Turbidity (NTU) | 39 |  | 1.3 | 1.4 |
| Settling velocity (m/h) |  |  | 4.4 | 9 |

As we can see in table 3, the ballasted precipitated particles settle twice faster than precipitated particles. An optimized ballasted flocculation will produce better residual turbidity after the clarification (i.e. settling) step.

Example 2: process according to the present invention containing steps (a), (b1), (b), (c), (d) and (e)

In this example, carbonates and silica contained in water are removed in a single process.

Figure 6:
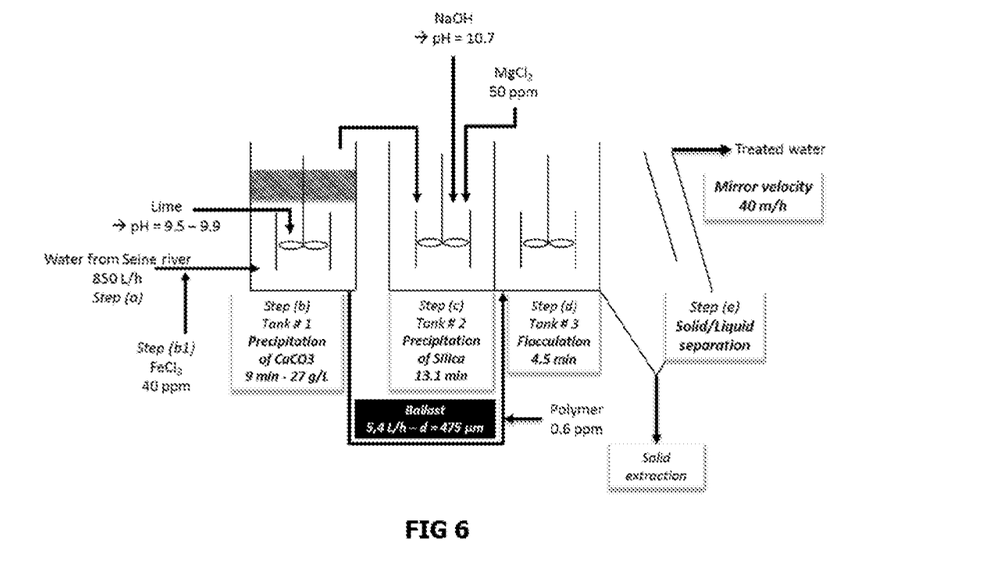
FIG. 6 represents a schematic view of the system used in example 2 for carrying out the process according to the present invention.

The schematic view of the system used in this example is represented in FIG. 6. In this configuration, coagulation (step b1) is performed first, before step (b).

Calcium carbonate is the first inorganic salt according to the present invention and silica the second inorganic salt according to the present invention.

Water of step (a) is the water from the Seine River. 850 L/h of this water is added in the reactor of step (b).

The coagulation step (b1) is carried out directly in the pipe which feeds the reactor of step (b). The coagulant $FeCl_3$ is added in an amount of 40 mg/L. Step (b) is carried out in reactor (tank) #1. The reactor used is the reactor described in WO2013/150222 (l×L×h=500×500×1300 mm with a precipitation volume of 130 L) with a Total Suspended Solids content of 27 g/L and a hydraulic residence time of 9 minutes.

Lime is added as a reagent in order to obtain a pH of between 9.5 and 9.9 and to obtain the precipitation and crystallization of $CaCO_3$ in the reactor of step (b).

$MgCl_2$ at a concentration of 50 mg/L and NaOH in order to obtain a pH of 10.7 are added in the reactor of step (c) (tank #2) in order to obtain the precipitation of silica. The hydraulic residence time in the reactor of step (c) is 13 min.

The flocculant which is an anionic polyacrylamide polymer, at a concentration of 0.6 mg/L, is added to the ballast before their addition in the flocculation step (d). The flocculation step (d) is carried out in reactor (tank) #3, which is a Turbomix® reactor fully agitated.

The ballast has a D50 in volume measured by a Beckman Coulter granulometer LS13 320 used with software LS3 series of 475 µm and is added in the flocculation step (d) at flowrate of 5.4 L/h.

The water treated after the solid-liquid separation step (e) has a mirror velocity of 40 m/h.

The chemical characteristics of the effluent before and after treatment are as follow:

TABLE 4

Results obtained in process configuration of example 2

|  | Raw water | Reactor #1 | Reactor #1 Outflow | Reactor #2 | Treated water |
|---|---|---|---|---|---|
| pH | 8 | 9.8 | 9.7 | 10.7 | 10.6 |
| Turbidity (NTU) | 9 |  | 280 |  | 18 |
| TSS (mg/L) | 8 | 27600 | 260 | 478 | 18 |
| Ca (mg/L) | 94 |  | 30 |  | 32 |
| Mg (mg/L) | 3 |  | 4 |  | 22 |
| TAC (eq. mg $CaCO_3$/L) | 150 |  | 40 |  | 60 |
| $SiO_2$ (mg/L) | 31 |  | 25 |  | 10 |

The process according to the invention therefore allow in the case of example 2 the elimination of 67% by weight of the silica contained in the effluent to be treated while 65% by weight of calcium and 60% of alkalinity is also eliminated despite their differences in elimination conditions (pH, reagents . . . ).

The invention claimed is:

1. A process for treating waters containing dissolved inorganic salts by precipitation and ballasted flocculation comprising the following steps:
   a—supplying water containing dissolved inorganic salts, said inorganic salts comprising at least two different inorganic salts which do not precipitate and/or crystallize in the same conditions;
   b—in a first reactor precipitating and/or crystallizing a first inorganic salt in order to obtain particles having a controlled size whose D50 in volume measured by a Coulter granulometer is within 10 to 2500 µm, and separating on the one hand water depleted in said first inorganic salt and on the other hand precipitated/crystallized particles of said first inorganic salt having the controlled size, wherein said first reactor is capable of simultaneously carrying out the precipitation and/or crystallization and a classification of the size of the particles;
   c—in a second reactor precipitating a second inorganic salt from the water depleted in said first inorganic salt and collecting water depleted in said first and second inorganic salts;
   d—flocculating by addition, in the water depleted in said first and second inorganic salts, of a flocculant, and of a ballast which is stable in the flocculation conditions, said ballast being constituted by some or all the precipitated/crystallized particles of said first inorganic salt having a controlled size obtained in step (b); and e—separating the treated water from the solid contained therein and collecting said treated water.

2. The process according to claim 1, comprising a coagulation intermediary step (b1) between steps (b) and (c) or between steps (a) and (b), by addition of a coagulant.

3. The process according to claim 1, wherein the water of step (a) is an industrial, municipal, surface or underground water.

4. The process according to claim 1, wherein the reactor of step (b) is a high solid reactor with integrated solid-liquid separation or a fluidized bed.

5. The process according to claim 1, wherein the two different inorganic salts precipitate in different pH conditions and/or in different temperature conditions and/or by addition of different precipitation reagents and/or by addition of another solvent and/or in different redox conditions.

6. The process according to claim 1, wherein said first inorganic salt is selected from calcium carbonate, calcium sulfate, barium sulfate and mixture thereof.

7. The process according to claim 1, wherein said second inorganic salt is selected from silica salts, fluorides salts, phosphates salts, strontium salts, metallic salts and mixture thereof.

8. The process according to claim 1, wherein:
said first inorganic salt is calcium carbonate and said second inorganic salt is selected from silica salts, metallic salts and mixture thereof or
said first inorganic salt is calcium sulfate and said second inorganic salt is selected from fluorides salts, phosphates salts and mixture thereof or
said first inorganic salt is barium sulfate and said second inorganic salt is strontium salts.

9. The process according to claim 1, wherein the flocculant is brought into contact with the ballast before their use in step (d).

10. The process according to claim 1, wherein part of the water of step (a) is directly added in step (c), without being pre-treated in step (b).

11. The process according to claim 1, wherein step (e) is carried out in a lamellar clarifier.

12. The process according to claim 1, wherein the reactor of step (c) is stirred.

13. The process according to claim 1, wherein steps (c) and (d) are carried out simultaneously in the same reactor.

14. The process according to claim 1, wherein steps (c) and (d) are carried out successively in different reactors.

15. The process according to claim 14, wherein the reactor of step (d) is stirred.

16. The process according to claim 4, wherein the reactor of step (b) is a high solid reactor with integrated solid-liquid separation.

17. The process according to claim 1, wherein the particles of step (b) have a controlled size whose D50 in volume measured by a Coulter granulometer is within 50 to 1000 µm.

18. The process according to claim 1, wherein the flocculant is a polyacrylamide polymer.

19. The process according to claim 2, wherein the coagulant is a trivalent metal salt.

20. The process according to claim 3, wherein the water of step (a) is a waste water or an industrial water.

* * * * *